United States Patent Office 3,842,130
Patented Oct. 15, 1974

3,842,130
PROCESS FOR PREPARING 2,3,5-TRIMETHYL HYDROQUINONE
Takuo Kawaguchi and Takashi Nishida, Kurashiki, Yoshiaki Ohmura, Okayama, Masahisa Tanomura, Kurashiki, Kozo Nakao, Okayama, and Toshiaki Takagi, Yoichi Ninagawa, and Kazuo Itoi, Kurashiki, Japan, assignors to Kuraray Co., Ltd., Kurashiki, Japan
No Drawing. Filed Nov. 6, 1972, Ser. No. 303,912
Claims priority, application Japan, Nov. 5, 1971, 46/88,436, 46/88,437
Int. Cl. C07c 37/00
U.S. Cl. 260—621 H                    7 Claims

ABSTRACT OF THE DISCLOSURE

A process for preparing pure white, crystalline 2,3,5-trimethyl hydroquinone is provided. According to this process, 2,3,5-trimethyl benzoquinone is contacted, while dissolved in a carboxylic acid ester with hydrogen in the presence of a hydrogenation catalyst under hydrogenation reaction conditions. In a preferred embodiment of the invention, the product is precipitated from solution by adding thereto a liquid hydrocarbon which is a poor solvent for the 2,3,5-trimethyl hydroquinone.

---

The present invention relates to an improved process for preparing 2,3,5-trimethyl hydroquinone. The process of the present invention enables the production of pure white, crystalline 2,3,5-trimethyl hydroquinone which resists discoloration due to exposure to ambient atmospheric conditions for long periods of time.

The compound 2,3,5-trimethyl hydroquinone is useful as an antioxidant for fats and oils, as an ultra-violet light absorber for plastics, and as an intermediate for the preparation of medicines such as α-tocopherol (vitamin E).

In general, two methods for producing 2,3,5-trimethyl hydroquinone from 2,3,5-trimethyl benzoquinone are already known to the art.

According to one of these methods, 2,3,5-trimethyl benzoquinone is chemically reduced to 2,3,5-trimethyl hydroquinone. This method is disclosed in the specification of British Pat. No. 1,244,470.

According to the other of these processes, 2,3,5-trimethyl benzoquinone is catalytically hydrogenated to 2,3,5-trimethyl hydroquinone with molecular hydrogen gas in the presence of a catalyst, such as platinum metal or palladium metal. This process is disclosed in U.S. Pat. Nos. 2,229,573 and 2,259,936 and Canadian Pat. No. 880,364.

The present invention relates to the improvement of this latter process.

It is disclosed in the Canadian Pat. No. 880,364, that the hydrogenation of 2,3,5-trimethyl benzoquinone is preferably carried out in solution. The solvents disclosed as useful according to this procedure are organic solvents such as alcohols, ethers, and glacial acetic acid, with aliphatic alcohols having from 3 to 5 carbon atoms being especially preferred.

However, the reaction solutions obtained according to this procedure have a tendency to discolor on standing at atmospheric conditions. Moreover, the 2,3,5-trimethyl hydroquinone produced by the above process has a tendency to gradually discolor on standing at atmospheric conditions.

According to our investigation, this phenomenon has been found to occur due to the formation of a complex between the product 2,3,5-trimethyl hydroquinone and 2,3,5-trimethyl benzoquinone which results from the auto-oxidation of the 2,3,5-trimethyl hydroquinone upon standing at ambient atmospheric conditions.

Discolored 2,3,5-trimethyl hydroquinone is inadequate for use in the production of medicines such as α-tocopherol because the quality of the product depends to a large degree upon the purity of the starting material. Accordingly, when using crystalline 2,3,5-trimethyl hydroquinone prepared according to known procedures, it is generally necessary to purify it prior to use, such as by recrystallization or reprecipitation.

It is therefore an object of the present invention to provide an improved process for preparing 2,3,5-trimethyl hydroquinone.

It is a further object of the present invention to provide a process for preparing pure white crystalline 2,3,5-trimethyl hydroquinone.

It is a further object of the present invention to provide a process for preparing 2,3,5-trimethyl hydroquinone which resists discoloration due to standing under ambient atmospheric conditions.

It is a further object of the present invention to provide a process for preparing 2,3,5-trimethyl hydroquinone in high yield.

The above and other objects are accomplished according to the present invention which is based upon the discovery that the proclivity toward coloration is due in large part to solvents previously employed in the hydrogenation process. It has now been discovered that pure white, crystalline color stable 2,3,5-trimethyl hydroquinone is obtained by a process which comprises contacting a solution of 2,3,5-trimethyl benzoquinone, in a carboxylic acid ester having from 2 to 12 carbon atoms, with hydrogen gas in the presence of a hydrogenating catalyst under hydrogenation reaction conditions; precipitating the 2,3,5-trimethyl hydroquinone from solution; and recovering the 2,3,5-trimethyl hydroquinone. It is preferred that the precipitation of the product from the hydrogenated reaction mixture be effected by adding a hydrocarbon liquid to said reaction mixture after completion of the hydrogenation step. Optionally, at least a portion of the carboxylic acid ester may be removed by distillation either before or after adding the liquid hydrocarbon precipitant. In order to facilitate distillation of the ester after the hydrocarbon has been added, it is preferred that the ester have a lower boiling point than the hydrocarbon.

Any carboxylic acid ester having from 2 to 12 carbon atoms may be used as the solvent according to the present invention. These include the esters of alkyl, cycloalkyl, aromatic, aralkyl mono- or dibasic acids with alkyl, cycloalkyl, aromatic, aralkyl monohydric or dihydric alcohols, and cyclic esters such as lactones. For example, cyclohexyl acetate, 2-etheylhexyl acetate, benzyl acetate, dimethyl succinate, methyl benzoate, ethylene glycol diacetate and γ-butyrolactone may be used in the present invention.

Among the more preferred carboxylic acid esters are those having the general formula:

RCOOR' wherein R is hydrogen or an alkyl radical having from 1 to 6 carbon atoms and R' is an alkyl radical having from 1 to 8 carbon atoms, and wherein the total number of carbon atoms in the ester is not more than 12.

The preferred carboxylic acid esters are the esters of formic acid, acetic acid, propionic acid, n- or i-butyric acid, where the alcoholic moiety R' includes lower aliphatic alcohols such as methanol, ethanol, n- or i-propanol and n-, i-, sec- or tert-butanol.

The hydrogenation catalyst to be employed in the present invention may include those selectively reducing the keto-group while inert to the esters and aromatic rings. In general, noble metal catalysts such as Pd and Pt which optionally may be supported, for example, on active carbon, are preferred. Other metal catalysts, such as Raney nickel may also be employed for the purpose, as is well known in the art.

The conditions of the hydrogenation may vary depending on the kind of the catalyst. In general, however, the reaction is carried out at temperatures within the range of from 0° C. to 150° C. under a hydrogen gas pressure of from 1 to 200 atmospheres.

The carboxylic acid ester is desirably present in quantities sufficient to keep the resultant 2,3,5-trimethyl hydroquinone in solution at reaction conditions, preferably in a weight ratio of 3:1 to 50:1.

Upon completion of the hydrogenation procedure, the crystalline 2,3,5-trimethyl hydroquinone can be recovered by conventional techniques. For example, it is possible to remove the catalyst by filtration, distill off the solvent, cool the solution to deposit crystalline 2,3,5-trimethyl hydroquinone, and separate the crystals thus formed by filtration.

According to a preferred embodiment of the present invention, the product 2,3,5-trimethyl hydroquinone is precipitated by adding a hydrocarbon liquid which is a poor solvent for the product. In this manner, the impurities contained in the starting 2,3,5-trimethyl benzoquinone, and those resulting from side reactions and the like, remain in the filtrate, so that the crystalline product separated by filtration is substantially pure and white. The product 2,3,5-trimethyl hydroquinone obtained according to the practice of the present invention has high purity, quality and color stability. This is attributable to the combined effect of using a carboxylic acid ester as the solvent during hydrogenating and of using a liquid hydrocarbon precipitant for inducing crystallization of the desired product.

Various aliphatic, alicyclic and aromatic hydrocarbons can be employed as the liquid hydrocarbon precipitant in this embodiment of the present invention. Exemplary of the suitable hydrocarbon liquids are pentane, hexane, heptane, octane, cyclohexane, cyclohexene, benzene, toluene, xylene, and mixtures thereof.

It has been found that loss of product and the amount of the liquid hydrocarbon required can be minimized by removing at least a portion, and preferably most, of the carboxylic acid ester from the reaction mixture prior to precipitation of the product. The solvent can be removed by distillation prior to, during or after, the addition of the liquid hydrocarbon precipitant. In order to ensure efficient distillation of the carboxylic acid ester from the reaction mixture, it is preferable to select ester and liquid hydrocarbon combinations wherein the ester boils at a substantially lower temperature than the liquid hydrocarbon.

The following examples are presented for the purpose of further illustrating and comparing the present invention, and are not to be taken as limiting in any sense. Unless otherwise indicated, all parts and percentages are by weight.

EXAMPLE 1

A. Several exemplary carboxylic acid esters are employed as solvents in the hydrogenation of 2,3,5-trimethyl benzoquinone. Each run is performed according to the procedure detailed below using one of the solvents shown in Table 1. In each run, 1.0 kg. of 2,3,5-trimethyl benzoquinone was dissolved in 10 l. of the specified carboxylic acid ester, and 5.0 g. of 3% palladium-on-activated carbon catalyst was added to the resultant solution. The hydrogenation was then performed at room temperature under a hydrogen pressure of 30 kg./cm.$^2$ whereupon the absorption of hydrogen ceases after 80 minutes. The reaction mixture was filtered to remove the catalyst, evaporated to remove a portion of the solvent, and chilled to effect crystallizaion. The crystals were collected by filtration and dried under reduced pressure to afford pure white crystals of 2,3,5-trimethyl hydroquinone. The results are summarized in Table 1.

TABLE 1

| Solvent | Yield of 2,3,5-trimethyl hydroquinone (percent) | Color of the product |
| --- | --- | --- |
| Ethyl acetate | 89.4 | Pure white. |
| Isobutyl acetate | 92.5 | Do. |
| Ethyl formate | 88.6 | Do. |
| γ-Butyrolactone | 89.6 | Do. |
| Cyclohexyl acetate | 88.5 | Do. |
| 2-ethylhexyl acetate | 88.7 | Do. |
| Benzyl acetate | 88.5 | Do. |
| Dimethyl succinate | 89.5 | Do. |
| Methyl benzoate | 87.8 | Do. |
| Ethylene glycol diacetate | 88.7 | Do. |

B. For comparison, several conventional solvents were used in the hydrogenation of 2,3,5-trimethyl hydroquinone in place of the carboxylic acid esters employed in part A. Except for the difference in the solvents, the procedure employed was the same as that used in part A. The solvents used in this comparative test were: (1) methanol, (2) tertiary butyl alcohol, (3) tetrahydrofuran, and (4) dioxane. In each run the product 2,3,5-trimethyl hydroquinone was colored brown or pink.

EXAMPLE 2

A reaction mixture was prepared by dissolving 1.0 kg. of 2,3,5-trimethyl benzoquinone in 10 l. of isopropyl acetate and adding thereto 5.0 g. of a 3% palladium-on-activated carbon catalyst. This reaction mixture was heated to 50° C. at a hydrogen pressure of 5.0 kg./cm.$^2$ for 45 minutes to effect hydrogenation of the 2,3,5-trimethyl benzoquinone. After removal of the catalyst and partial evaporation of the solvent, the solution was chilled to precipitate a crystalline product. The crystals were separated by filtration and dried under reduced pressure to give white crystals of 2,3,5-trimethyl hydroquinone having a purity above 99% in a yield of 93.7%.

EXAMPLE 3

A. Several different carboxylic acid esters are employed as solvents in the hydrogenation of 2,3,5-trimethyl benzoquinone. Each run is performed according to the procedure detailed below employing one of the solvents shown in Table 2. In each run, 20 g. of 2,3,5-trimethyl benzoquinone was dissolved in 200 ml. of the specified solvent, and 0.15 g. of a 3% palladium-on-active carbon catalyst was added to the resultant solution. The hydrogenation was then performed by supplying hydrogen at ambient temperature and pressure until absorption of hydrogen ceased after 300 minutes. The catalyst was removed by filtration and about 180 ml. of the solvent was removed by distillation. Thereupon, 200 ml. of toluene was added to the remaining solution to precipitate crystalline 2,3,5-trimethyl hydroquinone. This crystalline product was then collected by filtration, washed several times in toluene, and dried under reduced pressure. The results are summarized in Table 2.

B. For comparison, several conventional solvents were used in the hydrogenation of 2,3,5-trimethyl hydroquinone in place of the carboxylic acid esters employed in part A of this example. Except for the difference in the solvents, the procedure employed was the same as that used in part A of this example. The solvents employed and results obtained are shown in Table 2.

TABLE 2

| | Solvent | Yield of 2,3,5-trimethyl hydroquinone (percent) | Color of the product |
| --- | --- | --- | --- |
| A | Ethyl acetate | 95.6 | Pure white. |
| | Isopropyl acetate | 97.2 | Do. |
| | Methyl propionate | 95.8 | Do. |
| | γ-Butyrolactone | 93.7 | Do. |
| B | Methanol | 96.2 | Black. |
| | Dioxane | 94.1 | Do. |
| | Tertiary butanol | 94.3 | Reddish brown. |

EXAMPLE 4

Heptane was employed as the precipitant in this example in place of the toluene employed in Example 3. Except for this change and the solvents listed in Table 3, the procedure of Example 3 was repeated in each run of this Example. The solvents listed opposite A in the table are carboxylic acid esters according to the present invention, while those listed opposite B are solvents outside the scope of the present invention.

| Solvent | | Yield of 2,3,5-trimethyl hydroquinone (percent) | Color of the product |
|---|---|---|---|
| A | Ethyl acetate | 94.6 | Pure white. |
| | Isopropyl acetate | 96.0 | Do. |
| | Methyl butyrate | 95.7 | Do. |
| B | Tertiary butanol | 97.2 | Black. |
| | Tetrahydrofuran | 94.1 | Reddish black. |

EXAMPLE 5

A solution of 50 g. of 2,3,5-trimethyl benzoquinone in 40 ml. of ethyl acetate was subjected to hydrogenation using 0.03 g. of a 3% palladium-on-active carbon catalyst at 50° C. under a hydrogen pressure of 2.0 kg./cm.$^2$. The hydrogenation reaction was completed in 90 minutes. After removing the catalyst by filtration, the reaction mixture was drowned in cyclohexane to yield white crystals of 2,3,5-trimethyl hydroquinone. The crystalline product was collected by filtration, washed, and dried under reduced pressure to give pure white crystals of 2,3,5-trimethyl hydroquinone.

EXAMPLE 6

A reaction mixture was prepared by dissolving 60 g. of 2,3,5-trimethyl benzoquinone in 220 ml. of ethyl acetate and adding 2 g. of Raney nickel (type W-7) as a catalyst. The reaction mixture was placed in a 500 ml. autoclave equipped with an electromagnetic stirrer. Hydrogen gas was introduced into the autoclave under a pressure of 110 kg./cm.$^2$ while the temperature of the reaction mixture was maintained at 150° C. The reaction was completed in 6 hours. Analysis of the reaction mixture by gas chromatography showed no evidence of 2,3,5-trimethyl cyclohexane diol, the hydrogenation product of 2,3,5-trimethyl hydroquinone. After adding 600 ml. of toluene to the reaction mixture, the resultant mixture was distilled in a nitrogen atmosphere to remove the ethyl acetate. The toluene mixture was then allowed to cool to room temperature to precipitate needle-shaped crystals of 2,3,5-trimethyl hydroquinone. The crystalline product was collected by filtration in a yield of 57 g.

EXAMPLE 7

A reaction mixture was prepared by dissolving 50 g. of 2,3,5-trimethyl benzoquinone in 175 ml. of ethyl acetate and adding thereto 2.5 g. of platinic oxide (PtO$_2$) as a catalyst. Hydrogen gas was then introduced into the solution under atmospheric pressure at 20° C. to effect the hydrogenation reaction. The reaction was completed in 75 minutes. The product 2,3,5-trimethyl hydroquinone was recovered from the reaction mixture in the same manner as in Example 6 in a yield of 47 g.

Many obvious modifications and variations of the present invention will become apparent to those skilled in the art upon reading the above disclosure, and it is intended that all such modifications and variations be included within the scope of the present invention as defined by the following claims.

What is claimed is:

1. A process for producing pure white, crystalline 2,3,5-trimethyl hydroquinone which comprises contacting 2,3,5-trimethyl benzoquinone, dissolved in a carboxylic acid ester having the following formula:

RCOOR' wherein R is hydrogen or an alkyl radical having from 1 to 6 carbon atoms, and R' is an alkyl radical having from 1 to 8 carbon atoms, provided that the total number of carbon atoms is not more than 12, the weight ratio of carboxylic acid ester to benzoquinone being in the range of from about 3:1 to 50:1 with hydrogen gas in the presence of a hydrogenating catalyst selected from the group consisting of platinum, palladium and nickel, at a temperature within the range of 0° C. to 150° C., and a hydrogen gas pressure within the range of 1 to 200 atmospheres, precipitating the 2,3,5-trimethyl hydroquinone from solution, and recovering the 2,3,5-trimethyl hydroquinone.

2. A process according to claim 1 wherein said carboxylic acid ester is a member selected from the group consisting of methyl, ethyl, n- or i-propyl, n-, i-, sec- or tert-butyl esters of formic, acetic, n- or i-propionic, and butyric acids.

3. A process for producing pure white, crystalline 2,3,5-trimethyl hydroquinone which comprises contacting 2,3,5-trimethyl benzoquinone, dissolved in a carboxylic acid ester having the following formula:

RCOOR' wherein R is hydrogen or an alkyl radical having from 1 to 6 carbon atoms, and R' is an alkyl radical having from 1 to 8 carbon atoms, provided that the total number of carbon atoms is not more than 12, the weight ratio of carboxylic acid ester to benzoquinone being in the range of from about 3:1 to 50:1 with hydrogen gas in the presence of a hydrogenating catalyst selected from the group consisting of platinum, palladium and nickel, at a temperature within the range of 0° C. to 150° C., and a hydrogen gas pressure within the range of 1 to 200 atmospheres, precipitating the 2,3,5-trimethyl hydroquinone from solution by adding a liquid hydrocarbon precipitant to the solution, the hydrocarbon being selected from the group consisting of pentane, hexane, heptane, octane, cyclohexane, cyclohexene, benzene, toluene, xylene and mixtures thereof, and recovering the 2,3,5-trimethyl hydroquinone.

4. A process according to claim 3 wherein at least a portion of the carboxylic acid ester is distilled out of the solution after the step of adding liquid hydrocarbon.

5. A process according to claim 3 wherein at least a portion of the carboxylic acid ester is distilled out of the solution before the step of adding liquid hydrocarbon.

6. A process according to claim 3 wherein the boiling point of the liquid hydrocarbon is higher than that of the carboxylic acid ester.

7. A process according to claim 3 wherein said organic acid ester is a member selected from the group consisting of methyl, ethyl, n- or i-propyl, n-, sec- or tert-butyl alcohol esters of formic, acetic, n- or i-propionic and butyric acids.

References Cited

UNITED STATES PATENTS

| 3,723,541 | 3/1973 | Schuster et al. | 260—621 H |
| 2,259,936 | 10/1941 | Jung | 260—621 H |

FOREIGN PATENTS

| 7011586 | 2/1971 | Netherlands | 260—621 H |
| 595,514 | 12/1947 | Great Britain | 260—621 H |

LEON ZITVER, Primary Examiner

N. MORGENSTERN, Assistant Examiner